(No Model.)

2 Sheets—Sheet 1.

M. H. MOSKOVITS.

FURNACE GRATE.

No. 11,126. Reissued Nov. 18, 1890.

Witnesses:
F. G. Fischer
S. Z. C. Hosson

Inventor:
Maximilian H. Moskovits
By Richard H. Manning Atty.

(No Model.) 2 Sheets—Sheet 2.

M. H. MOSKOVITS.

FURNACE GRATE.

No. 11,126. Reissued Nov. 18, 1890.

Witnesses:
F. G. Fischer
S. L. C. Hosson

Inventor:
Maximilian H. Moskovits
By Rich. H. Manning Atty.

UNITED STATES PATENT OFFICE.

MAXIMILIAN H. MOSKOVITS, OF KANSAS CITY, MISSOURI.

FURNACE-GRATE.

SPECIFICATION forming part of Reissued Letters Patent No. 11,126, dated November 18, 1890.

Original No. 399,688, dated March 19, 1889. Application for reissue filed March 24, 1890. Serial No. 345,156.

*To all whom it may concern:*

Be it known that I, MAXIMILIAN H. MOSKOVITS, a citizen of the United States, residing at Kansas City, in the county of Jackson and State of Missouri, have invented certain new and useful Improvements in Furnace-Grates, of which the following is a full, clear, and exact description, reference being had to the accompanying drawings, forming a part of this specification.

My invention relates to furnaces having automatic feeding and cleaning devices; and it consists in the novel construction and combination of parts, which will be first fully described, and specifically pointed out in the claims.

Figure 1:
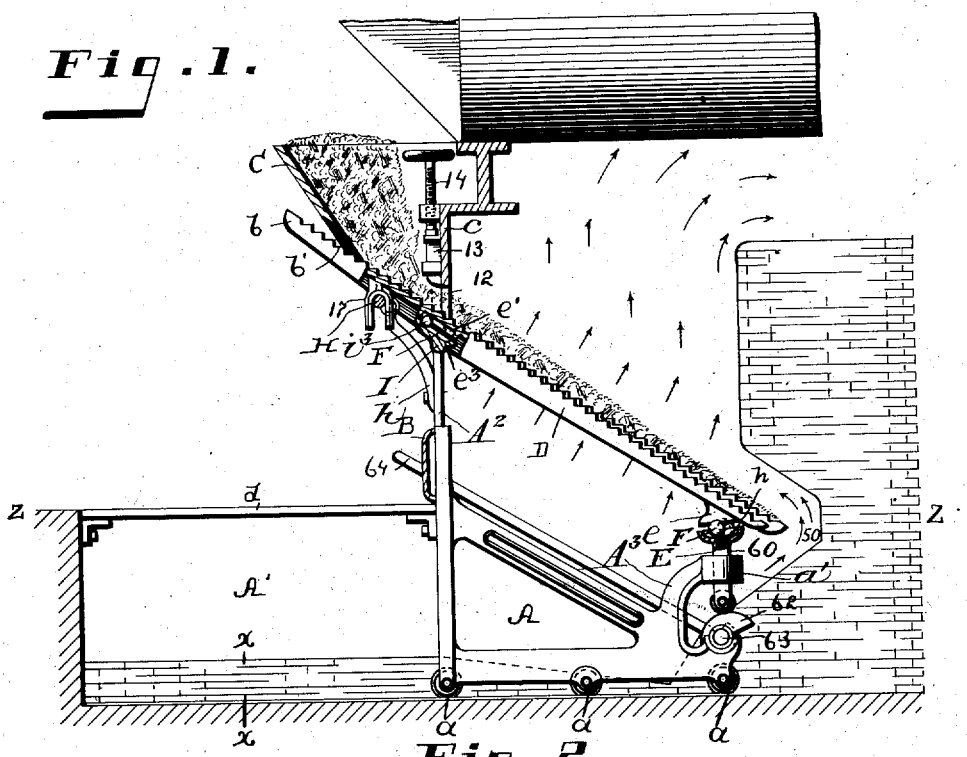
Figure 2:
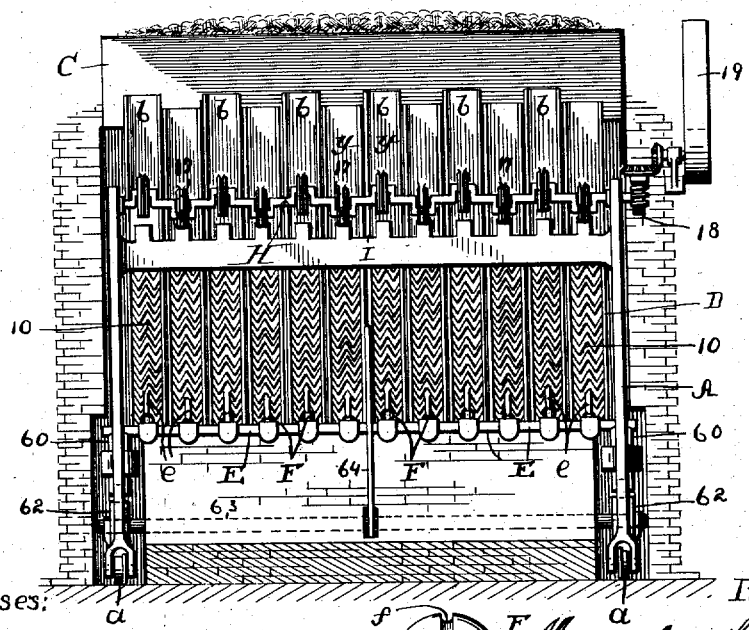
Figure 3:
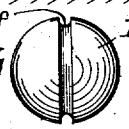
Figure 4:
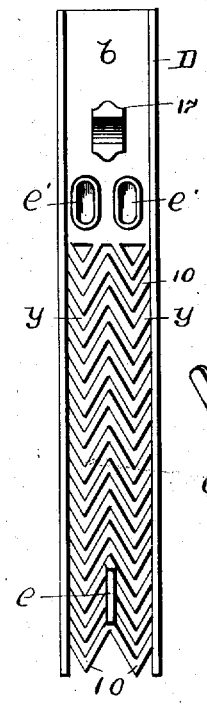
Figure 5:
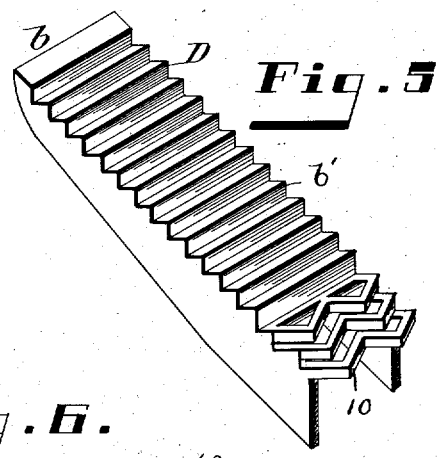
Figure 6:
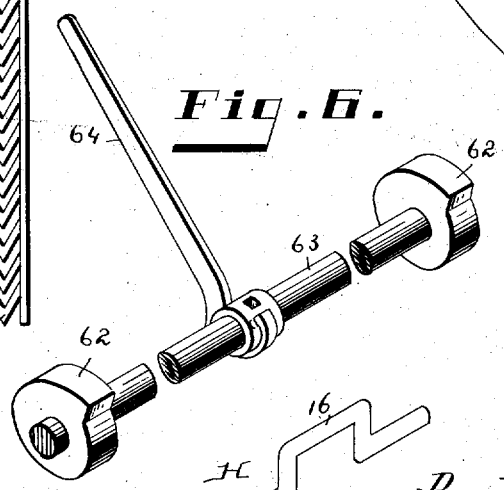
Figure 7:
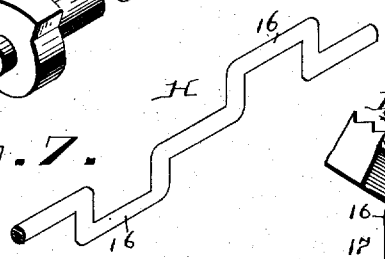
Figure 9:
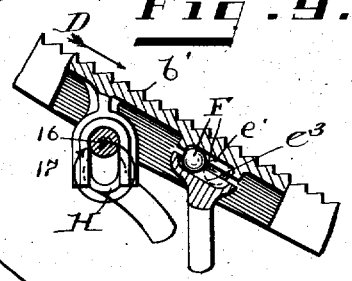
Figure 8:
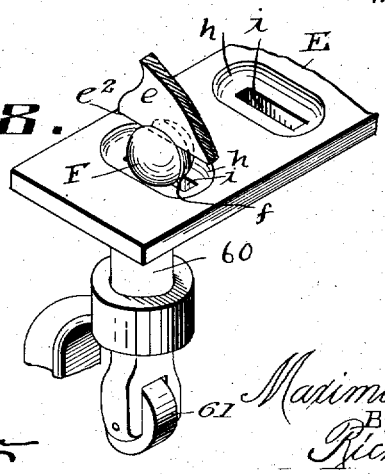

In the drawings, which illustrate the manner of carrying out my invention, Figure 1 is a broken sectional side elevation of my improved furnace-grate as applied to a steam-boiler furnace with horizontal boiler. Fig. 2 is a front elevation of same, looking beneath the grate-bars, with the furnace-doors removed. Fig. 3 is a detail view of one of the guide-bearing rollers or balls. Fig. 4 is a detail plan view of the under side portion of one of the reciprocating grate-bars. Fig. 5 is a detail cross-sectional view in perspective of the upper end portion of one of the grate-bars, the cross-section being taken upon line *y y*, Fig. 4. Fig. 6 is a detail view of the hand-lever and connections for varying the inclination of the grate-bars. Fig. 7 is a detail view of the multiform crank-shaft used for communicating motion to the grate-bars. Fig. 8 is a view in perspective of an end portion of the bearing-bar which supports the ends of the grate-bars. Fig. 9 is a detail longitudinal sectional view of the upper end portion of one of the grate-bars broken away near the forked bearing-lug, also showing the upper end portion of one of the respective supporting-posts for the transverse grate-bar support, and the crank-supporting brackets, showing the transverse bar in section, the end portion of the crank-shaft and the roller-bearing sockets and roller.

The furnace-front may be of the usual form, with the exception of ordinary feeding and ash-pit doors, which are entirely abandoned, that part of the ordinary furnace-front below the lower boiler-line being entirely removed, preferably so that the bottom of the grate-bars and of the interior of the furnace below the grates are perfectly exposed to view from a position in front of the boiler. If so desired, however, I may close the front of the furnace below the grate-bars and above the floor-line *z* by means of doors H of any ordinary form.

Each side of the furnace below the grate-bars consists of a heavy solid cast-iron frame-plate A, extending from the front to about the inner ends of the grate-bars, and from the front ends of which frame-plate A extend the vertical posts $A^2$ $A^2$, which posts support the cast-iron front carrying the feed-hopper C. From the said frame-plates A A near the rear end portion of said plates extend upwardly and rearwardly the curved arms $A^3$ $A^3$, and upon the end of each arm directly above the rear end of said plates A A is attached a thimble *a'*, for the purpose hereinafter described. Said side frames or plates A A are bound together by means of a horizontal bearing-bar E, which extends across from one plate A to the other, and upon which the lower end portion of the series of grate-bars D are mounted. Said frames or plates A A are made very heavy and support all the other work independently of the brick-setting, and one preferably mounted upon suitable wheels or rollers *a* and removably located in an ash-pit A', as shown more clearly in Fig. 1. Said pit not only extends under the boiler a sufficient distance to form an ordinary ash-pit, but it extends a sufficient distance in front of the boiler to allow the entire frame A (supporting the feeding apparatus) to be withdrawn from under the boiler whenever occasion may require.

The pit A' is provided with a suitable cover *d*, which may be quickly removed whenever required, in such instances as drawing the fire or cleaning out ashes.

In front of the boiler and above the upper ends of grate-bars D D a large iron hopper C is attached to the cast-iron front extending across the front, its length being equal to the width of the grate-surface and its capacity varying accordingly. The bottom of the hopper C is formed by the upper ends of grate-bars D, which extend outwardly a sufficient distance for such purpose. The grate-bars D are inclined at about an angle of thirty-four degrees from a horizontal line, and this position of the bars may be varied from a direct horizontal position to any angle of inclination thereto corresponding to the kind of fuel in use. Each grate-bar D is provided with depending longitudinal portions or sides *y y*, which are cast integral therewith and extend on both sides the entire length of the grate-bar. Said bars D are made with short longitudinal bearing-ribs *c*, projecting from the under side of their lower ends, which rest within an encircling groove *f*, formed on the outside of said bearing rollers or balls F. The bearing-edge $e^2$ of the ribs *e* are in a plane parallel to that of the upper surface of the bearing-bar E, and also describes nearly an acute angle to the plane of the under surface of said bars D, so that as the said bars are reciprocated upon their supports the deviation in the lines of the roller-bearings in the sockets *h*, receiving the rollers or balls F, will cause the lower ends of the grate-bars to rise and fall as the rollers or balls move along the inclined elongations of said sockets. Said balls or rollers are located in elongated sockets *h*, formed in the transverse bearing-bars E. Said sockets are provided with an opening or slit *i* in the bottom for egress of dirt and grit, which might otherwise collect in them and cause friction to be generated.

The upper ends of the grate-bars are fulcrumed upon the transverse bar I, the ends of which bar are rigidly attached to the respective posts $A^2$ $A^2$. Said upper ends of the grate-bars are provided upon their under surface between the flanges *y y* with elongated ball-sockets *e'* similar to those in bars E, and they rest upon suitable friction balls or rollers F, located in said bearing-bar I, as hereinafter described. Upon the said grate-bearing bar I are rigidly attached a series of lugs $i^3$, which extend a short distance in an upward direction from the upper surface of said bar between the flanges *y y* of the grate-bars D and elevate said bars sufficiently to prevent the flanges *y y* from frictional contact with said bar I. The upper surface of the lugs $i^3$ are inclined at an angle corresponding to the inclination of the grate-bars heretofore described, and in said inclined upper surface of said lugs $i^3$ are made the elongated bearing-sockets $e^3$. Said grate-bars are constructed with a solid upper end *b*, provided with steps or corrugations *b'* upon its upper side and with a fire-surface upon its lower portion, which is preferably made up of short transverse zigzag webs 10. The fire-surface may, however, be constructed in any other preferred form that will answer the purpose. It will be observed that the steps *b'* are continued over the entire upper surface of the grate-bars.

The transverse zigzag webs 10 are located at sufficient distance from each other to afford ample inclined openings into the burning fuel, insuring full supply of air, and not only promoting combustion, but also keeping the grate-bars comparatively cool and preventing them from being warped, melted, or burned out.

On the inner plate *c* of the feed-hopper C, I locate a vertically-sliding feed-plate, 13, which can be moved up and down by means of a suitable screw and hand wheel 14, or by any other preferred means, so as to close the feed-opening 12 more or less.

The roller-bearings in the sockets *h* in bar E at lower ends of grate-bars are rearwardly inclined, (see Fig. 1,) so that as said bars are alternately reciprocated longitudinally an alternate rising-and-falling movement will be imparted to their lower ends, thereby causing them to be oscillated upon the upper bearing-bar. This rising-and-falling movement of the vibrating ends may, however, be accomplished in changing the position of the upper surface of the grate-bearing bar E to that described by the inclined grate-bars in the same angle of inclination, or nearly so, in which position the longitudinal ribs upon the grate-bars will cause the rollers to travel in the elongated sockets and the ends of the grate-bars to rise and fall in a less degree than heretofore described.

Each grate-bar making up the grate has a rising-and-falling and endwise movement imparted to it by means of the multiform crank-shaft H, having a number of short cranks 16 formed on it which engage a suitable forked bearing-lug 17, depending from the under surface of grate-bars D near their upper ends.

The crank-shaft H is supported at both ends *h h*, and said ends afford a bearing in the upper ends of the brackets *h' h'*, each one of which brackets is attached at its lower end to the outer side portion of the respective posts $A^2$ in the plates A A, and said upper ends of said brackets are bent outwardly from said posts and extended upwardly in line with the lugs 17 on the under surface of the bars D.

Each alternate bar D is moved in the same direction by means of the several cranks on said shaft H. The lower ends of the bars D move up and down; but their upper ends rest and oscillate upon the upper bearing-bar F, and therefore do not follow the circular and up-and-down movement of cranks 16. A continuous rotary motion is imparted to this crank-shaft by means of a worm-gear 18 and belt 19 or other suitable gearing. (Shown at the right-hand side of Fig. 2.) The motion is such that one-half of the series of bars as thus arranged lift the body of the fuel from the bars between them (which are moving in an opposite direction) and cause said fuel to move evenly down toward the rear of the furnace. The movement of the fuel is still further aided by the steps formed on the upper side of the grate-bars, said steps imparting a movement to the feed and pushing it toward the rear of the furnace. The movement is positive and uniform and may be varied as occasion requires. The fuel entering the furnace by way of the feed-opening 12 is delivered at the top of the grate-bars, where the motion of the grate-bars, combined with gravity, causes it to move evenly along the inclined grate-bars toward the rear of the furnace.

All fuel on the grate-bars moves simultaneously and continuously. This movement is positive and uniform, although it may be accelerated or retarded, as the demand for steam production varies. The constant movement of the grate-bars prevents the formation thereon of clinkers. All the fuel is consumed on the inclined grate, and the feed is to be regulated accordingly.

The clinkers and ashes and other incombustible matter pass from the grate-bars through passage 50, formed in the brick-work at the lower end of said bars, to the ash-pit below, as shown in Fig. 1.

The feeding motion may be varied in various ways—for instance, by changing the speed of the driving-gearing or by imparting a different degree of inclination to the grate-bars, which latter I accomplish as follows:

The bearing-bars E at lower end of grate-bar are provided with vertical shanks 60, which fit within the thimbles $a'$ on the curved arms $A^3$ $A^3$ of the frames A A, and which shanks have friction-wheels 61 at their lower ends. These friction-wheels rest upon cams 62, mounted upon transverse shaft 63. Said shaft 63 is journaled at each end in the lower and rear end portion of the respective plates A A directly beneath the thimbles $a'$ on the arms $A^3$ $A^3$. By means of a hand-lever 64, which extends upwardly and outwardly a suitable distance to be conveniently reached, the shaft 63 may be slightly revolved in its bearings, causing the cam 62 to raise or lower the shank 60 and bearing-bar E, carrying the lower ends of the grate-bars, thus giving more or less inclination to said grate-bars and causing the fuel to travel downward upon them faster or slower, and in greater or less quantity, as the demand for steam requires.

The power required to drive the entire apparatus will be but a trifling amount, because the bars are entirely supported on balls F.

The machine may be driven by a belt from any convenient shaft, or a small special engine may be used for this purpose, as may be preferred by the proprietor of the plant.

Having fully described my invention, what I now claim as new, and desire to secure by Letters Patent, is—

1. In a furnace having side and ash-retaining walls, the combination with said walls, having suitable anti-friction transverse grate-bearing supports, of a grate consisting of a series of alternately-reciprocating grate-bars fulcrumed in the direction of one end upon one of said anti-friction-supports, and a transverse support for the other ends of said bars in the other direction, having rollers bearing upon the upper side of said transverse support, and also having elongated sockets for said rollers and rearwardly-inclined bearings for said rollers in said sockets, substantially as and for the purpose described.

2. In a furnace having side and ash-retaining walls, the combination, with said walls having transverse anti-friction grate-bearing supports, of a grate consisting of a series of alternately-reciprocating grate-bars having longitudinal ribs upon their respective under surfaces and fulcrumed in the direction of one end upon one of the said anti-friction supports, and the other support for the other ends of said bars provided with elongated sockets having rearwardly-inclined bearings and rollers in said sockets, having peripheral grooves adapted to receive the ribs upon said grate-bars, substantially as described.

3. In a furnace having side and ash-retaining walls, the combination, with said walls having transverse anti-friction supports in the upper and lower portions of said side walls, of a grate consisting of a series of alternately-reciprocating grate-bars fulcrumed in the direction of their upper ends upon the upper transverse support and inclined at an angle to and in the direction of said ash-wall, and having longitudinal ribs upon the under surface of the respective grate-bars, and the bearing-edge of said ribs in a plane at an angle to the plane of the under surface of said bars, and the lower support for the lower ends of said bars provided with elongated sockets having rearwardly-inclined roller-bearings, and rollers in said sockets having peripheral grooves adapted to receive the bearing-edge portions of the ribs on said grate-bars, substantially as described.

4. In a furnace, the combination, with the side walls having an upper transverse grate-bearing support provided with raised lugs and elongated sockets in the upper surface of said lugs, of a grate consisting of a series of alternately-reciprocating grate-bars having side flanges, and their upper ends fulcrumed upon said guides and each bar provided at said bearing-point with elongated sockets upon its under surface between said side flanges and the bearing ends of each one of said bars provided with longitudinal ribs upon its under surface, and the bearing-edge of said ribs in a described plane at an angle to the plane of the under surface of said grate-bars, and a lower transverse support for the lower end of said bars provided with elongated sockets and rearwardly-inclined roller-bearings in said sockets and rollers in said sockets, each roller having a peripheral groove adapted to receive the bearing-edge of the ribs on said grate-bars, substantially as and for the purpose described.

5. The combination, in a furnace, of a grate having inclined grate-bars provided with suitable bearing-sockets near each end, friction-balls located in these sockets, a transverse bearing-bar provided with depending shanks supporting the lower ends of said grate-bars, cams in the path of the lower end portion of said shanks to raise and lower the same, and a hand-lever for rotating said cams, substantially as and for the purpose described.

6. The improved grate-bar constructed solid for a considerable portion of its length and with the remaining portion of its length in the form of a fire-surface composed of short zigzag webs which are disposed transversely, the upper surface of said bar being stepped or corrugated, substantially as described.

MAXIMILIAN H. MOSKOVITS.

Witnesses:
WARREN WATSON,
A. UTTER.